United States Patent
Yano et al.

(10) Patent No.: US 6,876,083 B2
(45) Date of Patent: Apr. 5, 2005

(54) ELECTROLYTIC CAPACITOR AND A FABRICATION METHOD THEREFOR

(75) Inventors: Mutsumi Yano, Hirakata (JP); Kazuhiro Takatani, Takatsuki (JP); Mamoru Kimoto, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 10/611,969

(22) Filed: Jul. 3, 2003

(65) Prior Publication Data

US 2004/0016978 A1 Jan. 29, 2004

(30) Foreign Application Priority Data

Jul. 26, 2002 (JP) ........................ 2002-217482
Mar. 24, 2003 (JP) ........................ 2003-080792

(51) Int. Cl.⁷ .................... H01L 23/48; H01L 23/52; H01L 29/40
(52) U.S. Cl. ........................ 257/764; 257/761
(58) Field of Search ................ 257/764, 249, 257/383, 762, 763, 781, 785, 767, 771

(56) References Cited

U.S. PATENT DOCUMENTS

| | | | |
|---|---|---|---|
| 3,597,664 A | * | 8/1971 | Villani ........................ 317/230 |
| 3,849,124 A | * | 11/1974 | Villani ........................ 75/177 |
| 4,633,373 A | * | 12/1986 | Phillips ........................ 361/433 |
| 5,034,857 A | * | 7/1991 | Wong .......................... 361/509 |
| 5,733,661 A | * | 3/1998 | Ue et al. ..................... 428/426 |
| 6,525,921 B1 | * | 2/2003 | Nakatani et al. ......... 361/306.3 |
| 6,545,858 B1 | * | 4/2003 | Naito et al. ................. 361/510 |

FOREIGN PATENT DOCUMENTS

| | | |
|---|---|---|
| JP | 5-121275 | 5/1993 |
| JP | 11-312628 | 11/1999 |

OTHER PUBLICATIONS

G.E. Thompson et al.; "The Migration of Fluoride Ions in Growing Anodic Oxide Films on Tantalum"; *Journal Electrochemical Society;* vol. 144; No. 2; pp. 418–423, Feb., 1997.

* cited by examiner

*Primary Examiner*—David Nhu
(74) *Attorney, Agent, or Firm*—Armstrong, Kratz, Quintos, Hanson & Brooks, LLP

(57) ABSTRACT

An electrolytic capacitor including one type of electrode selected from a group consisting of an electrode of at least one type of alloy selected from a group consisting of niobium alloy, titanium alloy, and tungsten alloy, an electrode of mixed sinter of niobium and aluminum, or a fluorine-doped electrode of niobium or niobium alloy and on a surface of each electrode a dielectric layer is formed by anodizing the electrode.

9 Claims, 2 Drawing Sheets

ELECTROLYTIC CAPACITOR AND A FABRICATION METHOD THEREFOR

BACKGROUND OF THE INVENTION

1. Field of the Invention

The present invention relates to an electrolytic capacitor and a fabrication method therefor, the electrolytic capacitor forming a dielectric layer by anodizing an electrode on a surface thereof. More particularly, the invention relates to an electrolytic capacitor featuring control of decrease of electrical insulation caused by crystallization of the dielectric layer in anodizing the electrode, and decreasing leakage current in an electrolytic capacitor.

2. Description of the Related Art

Recently, miniaturization of electronic machines has been bringing about a demand for a small-sized capacitor of great capacitance.

Capacitors having high capacitance are proposed as disclosed in JP-A-5-121275, such as an electrolytic capacitor employing titanium as an electrode and forming a dielectric layer of titanium oxide by anodizing the electrode, or as disclosed in JP-A-11-312628, which discloses an electrolytic capacitor forming a dielectric layer of oxide of metal by anodizing an electrode which employs valve metal composed by sintering powder of valve metal such as aluminum, tantalum, niobium, or titanium, on a surface of the electrode. By the way, the valve metal has the ability of rectification and anodization.

However, when the dielectric layer of oxide of the metal is formed on a surface of the electrode by anodizing the electrode which employs a valve metal composed of a sintering powder of valve metal such as aluminum, tantalum, niobium, or titanium, as mentioned above, the oxide of metal is easily crystallized in anodizing the electrode. Consequently, the electrical insulation of the dielectric layer decreases and leakage current in the electrolytic capacitor increases.

SUMMARY OF THE INVENTION

It is an object of the present invention to provide an electrolytic capacitor comprising an electrode with a dielectric layer formed by anodizing the electrode on a surface thereof, the capacitor with less leakage current obviating the decrease of electrical insulation by controlling crystallization of the dielectric layer in anodizing the electrode.

According to the present invention, the first electrolytic capacitor comprises: an electrode employing one type of alloy selected from a group consisting of niobium alloy, titanium alloy, and tungsten alloy; wherein a dielectric layer is formed by anodizing the electrode on a surface thereof.

When one type of alloy selected from the group consisting of niobium alloy, titanium alloy, and tungsten alloy is employed as an electrode, as suggested by the first electrolytic capacitor of the invention, the crystallization of the dielectric layer in anodizing the electrode is well-controlled in comparison with a case in which an element of niobium, titanium, or tungsten, is employed. Consequently, the decrease of electrical insulation is obviated and leakage current in the electrolytic capacitor decreases.

In the embodiment, the kind of niobium alloy is not limited, but it is preferable to use niobium alloy formed by alloying niobium with at least one type of additive metal selected from a group consisting of tungsten, vanadium, zinc, aluminum, molybdenum, hafnium, and zirconium, in order to control crystallization of the dielectric layer appropriately in anodizing the electrode. More preferably, when the electrode employing niobium alloy formed by alloying niobium with aluminum is anodized to form a dielectric layer, aluminum oxide as well as niobium oxide is contained in the dielectric layer. The excellent electrical insulation of aluminum oxide helps control crystallization of the dielectric layer in anodizing the electrode and leakage current.

The kind of titanium alloy is not limited, but it is preferable to use titanium alloy formed by alloying titanium with at least one type of additive metal selected from a group consisting of tungsten, vanadium, zinc, aluminum, molybdenum, hafnium, and zirconium, in order to appropriately control crystallization of the dielectric layer in anodizing the electrode.

The kind of tungsten alloy is not limited, but it is preferable to use a tungsten alloy formed by alloying tungsten with at least one type of additive metal selected from a group consisting of niobium, titanium, tantalum, vanadium, zinc, aluminum, molybdenum, hafnium, and zirconium, to appropriately control crystallization of the dielectric layer in anodizing the electrode.

Further, when the amount of additive metal is too small in the niobium alloy, the titanium alloy, or the tungsten alloy, it is difficult to appropriately control crystallization of the dielectric layer in anodizing the electrode. On the other hand, when the amount of the additive metal is too large, it is also difficult to appropriately control crystallization of the dielectric layer in anodizing the electrode. Hence, it is preferred that the additive metal content of each alloy is in the range of 0.0 to 10 wt %.

According to the present invention, the second electrolytic capacitor comprises: an electrode of mixed sinter of niobium and aluminum which is composed by sintering mixed powder of niobium and aluminum; wherein a dielectric layer containing niobium oxide and aluminum oxide is formed by anodizing the electrode on a surface thereof.

When the electrode of the mixed sinter of niobium and aluminum which is composed by sintering mixed powder of niobium and aluminum is anodized as suggested by the second electrolytic capacitor of the invention, oxygen ion diffuses in the electrode from the surface of the electrode, and niobium ion and aluminum ion migrate to the surface of the electrode. The niobium ion and the aluminum ion react with the oxygen ion on the surface of the electrode.

Because niobium ion has high ionic conductivity in comparison with aluminum ion, a layer of niobium oxide is first formed on a surface of the niobium particle, and then aluminum is oxidized in anodizing the electrode. In the oxidation of aluminum, it is considered that the aluminum ion diffuses in the layer of the niobium oxide and aluminum oxide is formed inside the layer of niobium oxide. It is also considered that the aluminum oxide formed in the layer of the niobium oxide controls crystallization of the dielectric layer and leakage current.

In the electrode of mixed sinter of niobium and aluminum, as suggested by the second electrolytic capacitor of the invention, an inappropriate amount of aluminum makes difficult to control crystallization of the dielectric layer appropriately in anodizing the electrode and hence, it is preferred that the amount of aluminum to the total amount of niobium and aluminum is in the range of 0.01 to 10 wt %.

According to the invention, the third electrolytic capacitor comprises: a fluorine-doped electrode of niobium or niobium alloy, wherein a dielectric layer is formed by anodizing the electrode on a surface thereof.

When the fluorine-doped electrode of niobium or niobium alloy is anodized as suggested by the third electrolytic capacitor of the invention, the doped fluorine controls crystallization of the dielectric layer in anodizing the electrode and obviates decrease of electrical insulation to provide the capacitor with less leakage current.

Further, in the third electrolytic capacitor of the invention, the electrode employing niobium alloy is effective in controlling crystallization of the dielectric layer in anodizing the electrode. As for niobium alloy, it is preferred to use the niobium alloy formed by alloying niobium with aforesaid additive metal. It is also preferred that the additive metal content of the niobium alloy is in the aforesaid range.

A fabrication method for the third electrolytic capacitor includes first doping fluorine by heat-treating an electrode of niobium or niobium alloy in fluorine gas atmosphere, and then forming a dielectric layer by anodizing the electrode on a surface thereof.

In the heat-treatment of the electrode of niobium or niobium alloy to dope fluorine, when the temperature of heat-treatment is over 225° C., the boiling point of niobium fluoride, it is difficult to dope fluorine appropriately and hence it is preferred that the temperature of heat-treatment is not higher than 200° C. and, more preferably, in the range of 40 to 150° C.

Further, in the fabrication method of the third electrolytic capacitor of the invention, fluorine is doped in an electrode of niobium or niobium alloy and a dielectric layer is formed on a surface of the electrode by anodizing the electrode in an aqueous solution of fluorine ions.

These and other objects, advantages and features of the invention will become apparent from the following description thereof taken in conjunction with the accompanying drawings which illustrate specific embodiments of the invention.

DESCRIPTION OF THE PREFERRED EMBODIMENTS

Hereinafter, electrolytic capacitors according to the preferred embodiments of the present invention will specifically be described while comparative examples will be cited to demonstrate that examples of the inventive electrolytic capacitor decreases leakage current by controlling crystallization of a dielectric layer. It is to be noted that the electrolytic capacitor of the invention should not be limited to the following examples thereof and suitable changes and modifications may be made thereto within the scope of the invention.

EXAMPLE A1

In Example A1, 1 g of tungsten(W) powder was added to 99 g of niobium(Nb) powder as an additive metal and then a rotary shaking mixer was operated for 20 minutes to mix the powder. The mixed powder was pressurized at 1500° C. in a vacuum environment until a thickness of 100 μm to make niobium alloy foil in which tungsten was diffused.

Next, the niobium alloy foil was cut in the size of 1 cm×5 cm. The niobium alloy foil was employed as an electrode and was anodized at 30 V in aqueous solution containing 0.6% by volume of phosphoric acid at 60° C. Thus was formed the dielectric layer on a surface of the electrode of niobium alloy foil.

Figure 1:
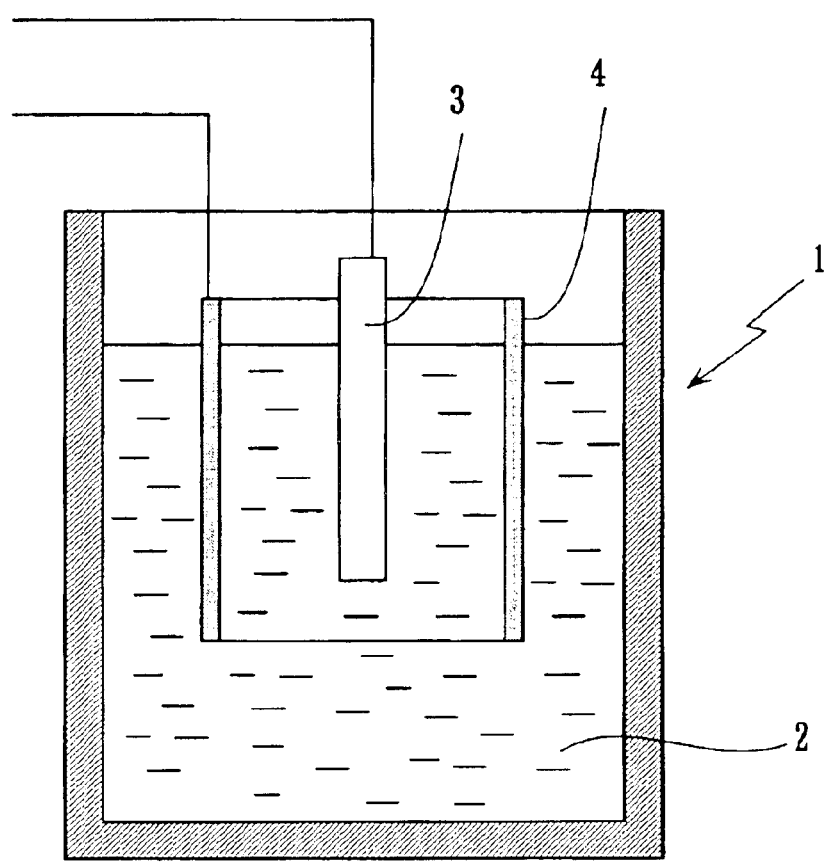
FIG. 1 is a schematic explanatory drawing of trial electrolytic capacitors which are fabricated in Example A to D and Comparative Example a to c.

Then, using the electrode of the niobium alloy foil with a dielectric layer formed on a surface of the electrode as an anode, as shown in FIG. 1, the anode 3 was immersed in an aqueous solution 2 containing 2 wt % of boric acid accommodated in the beaker 1. Also a cylindrical cathode of activated carbon 4 is immersed in the aqueous solution 2 containing boric acid, keeping away from while enclosing the anode 3. Thus was obtained a trial electrolytic capacitor of Example A1.

EXAMPLE A2

The same procedure as in Example A1 was used to fabricate a trial electrolytic capacitor of Example A2, except for the kind of additive metal. 1 g of vanadium(V) powder in place of tungsten powder in Example A1 was added to 99 g of niobium powder.

EXAMPLE A3

The same procedure as in Example A1 was used to fabricate a trial electrolytic capacitor of Example A3 except for the kind of additive metal. 1 g of Zinc(Zn) powder in place of tungsten powder in Example A1 was added to 99 g of niobium powder.

EXAMPLE A4

The same procedure as in Example A1 was used to fabricate a trial electrolytic capacitor of Example A4 except for the kind of additive metal. 1 g of aluminum(Al) powder in place of tungsten powder in Example A1 was added to 99 g of niobium powder.

EXAMPLE A5

The same procedure as in Example A1 was used to fabricate a trial electrolytic capacitor of Example A5 except for the kind of additive metal. 1 g of molybdenum(Mo) powder in place of tungsten powder in Example A1 was added to 99 g of niobium.

EXAMPLE A6

The same procedure as in Example A1 was used to fabricate a trial electrolytic capacitor of Example A6 except the kind of additive metal. 1 g of zirconium(Zr) powder in place of tungsten powder in Example A1 was added to 99 g of niobium.

EXAMPLE A7

The same procedure as in Example A1 was used to fabricate a trial electrolytic capacitor of Example A7, except the kind of additive metal. 1 g of hafnium(Hf) powder in place of tungsten powder in Example A1 was added to 99 g of niobium.

EXAMPLE A8

The same procedure as in Example A1 was used to fabricate a trial electrolytic capacitor of Example A8 except the kind of additive metal. 0.5 g of zinc(Zn) and 0.5 g of aluminum(Al) powder in place of 1 g of tungsten powder in Example A1 was added to 99 g of niobium.

COMPARATIVE EXAMPLE a1

In Comparative Example a1, the same procedure as in Example A1 was used to fabricate a trial electrolytic capacitor of Comparative Example a1, except that an element of niobium foil was made, in place of adding the tungsten powder as additive metal to the niobium powder in Example A1.

EXAMPLE B1

In Example B1, as in Example A1, 1 g of vanadium(V) powder was added to 99 g of titanium(Ti) powder as an additive metal and then a rotary shaking mixer was operated for 20 minutes to mix the powder. The mixed powder was pressurized at 1500° C. in a vacuum environment until having a thickness of 100 $\mu$m to make titanium alloy foil in which vanadium was diffused.

Next, the titanium alloy foil was cut in the size of 1 cm×5 cm. The titanium alloy foil was employed as an electrode and was anodized at 30 V in aqueous solution containing 0.6% by volume of phosphoric acid at 60° C. as in Example A1. Thus was formed the dielectric layer on a surface of the electrode of titanium alloy foil.

The same procedure as in Example A1 was used to fabricate a trial electrolytic capacitor of Example B1, except that employing the electrode of titanium alloy foil with a dielectric layer formed on a surface of the electrode as an anode in place of employing the electrode of niobium alloy foil as an anode in Example A1.

COMPARATIVE EXAMPLE b1

In Comparative Example b1, the same procedure as in Example B1 was used to fabricate a trial electrolytic capacitor of Comparative Example b1, except that an element of titanium foil was made, in place of adding the vanadium powder as an additive metal to the titanium powder to make the titanium alloy foil in Example B1.

In a mode, as a result of analysis by Electron Spectroscopy for Chemical Analysis (ESCA), it was confirmed that niobium oxide and aluminum oxide were contained in the dielectric layer of the electrolytic capacitors of the Example A4 and A8 in which niobium alloy and aluminum alloy were employed.

The resultant trial electrolytic capacitors of Examples A1 to A8, B1, Comparative Examples a1 and b1 were kept at 20 V and were each determined for leakage current after 2 seconds. An index number of leakage current of each of the trial electrolytic capacitors was determined on a basis of the leakage current of Example A1 trial electrolytic capacitor defined as 100. The results are listed in Table 1 as below.

TABLE 1

| | COMPOSITION OF ELECTRODE | INDEX NUMBER OF LEAKAGE CURRENT |
|---|---|---|
| EXAMPLE A1 | Nb:W = 99:1 | 100 |
| EXAMPLE A2 | Nb:V = 99:1 | 98 |
| EXAMPLE A3 | Nb:Zn = 99:1 | 101 |
| EXAMPLE A4 | Nb:Al = 99:1 | 96 |
| EXAMPLE A5 | Nb:Mo = 99:1 | 102 |
| EXAMPLE A6 | Nb:Zr = 99:1 | 103 |
| EXAMPLE A7 | Nb:Hf = 99:1 | 97 |
| EXAMPLE A8 | Nb:Zn:Al = 99:0.5:0.5 | 105 |
| COMPARATIVE EXAMPLE a1 | Nb = 100 | 250 |
| EXAMPLE B1 | Ti:V = 99:1 | 180 |
| COMPARATIVE EXAMPLE b1 | Ti = 100 | 500 |

As is apparent from the table, the trial electrolytic capacitors of Examples A1 to A8 decreased leakage current notably as compared with the trial electrolytic capacitor of Comparative Example a1 employing the electrode of an element of niobium with a dielectric layer formed by anodizing the electrode, the capacitors of Examples A1 to A8 employing the electrodes of niobium alloy formed by alloying niobium with at least one type of additive metal selected from a group consisting of tungsten, vanadium, zinc, aluminum, molybdenum, zirconium, and hafnium with a dielectric layers formed by anodizing the electrodes.

The trial electrolytic capacitor of Examples B1 also decreased the leakage current notably as compared with the trial electrolytic capacitor of Comparative Example b1 employing the electrode of an element of titanium with a dielectric layer formed by anodizing the electrode, the capacitors of Examples B1 employing the electrode of titanium alloy formed by alloying niobium with vanadium, with a dielectric layer formed by anodizing the electrode. Similar effects may be obtained when titanium alloy is formed by alloying titanium with at least one type of additive metal selected from a group consisting of tungsten, zinc, aluminum, molybdenum, zirconium, and hafnium in place of vanadium.

EXAMPLE A1.1~A1.10

The same procedure as in Example A1 was used to fabricate trial electrolytic capacitors of Example A1.1~A1.10, except that the rate of tungsten(W) powder of additive metal added to niobium(Nb) powder was changed to make niobium alloy foils that have different tungsten content(wt %) of the niobium alloy from that of Example A1 as listed in the Table 2.

The same determination for leakage current was taken as above mentioned, and an index number of leakage current of each of the resultant trial electrolytic capacitors of Examples A1.1 to A1.10 was determined on a basis of the leakage current of Example A1 trial electrolytic capacitor defined as 100. The results are listed in Table 2 as below.

TABLE 2

| | W CONTENT OF Nb ALLOY (wt %) | INDEX NUMBER OF LEAKAGE CURRENT |
|---|---|---|
| EXAMPLE A1.1 | 0.005 | 220 |
| EXAMPLE A1.2 | 0.01 | 120 |
| EXAMPLE A1.3 | 0.1 | 110 |
| EXAMPLE A1.4 | 0.5 | 105 |
| EXAMPLE A1 | 1.0 | 100 |
| EXAMPLE A1.5 | 2.5 | 107 |
| EXAMPLE A1.6 | 5.0 | 110 |
| EXAMPLE A1.7 | 7.5 | 120 |
| EXAMPLE A1.8 | 10.0 | 125 |
| EXAMPLE A1.9 | 11.0 | 200 |
| EXAMPLE A1.10 | 12.5 | 220 |

As is apparent from the table, the index numbers of leakage current of the trial electrolytic capacitors of Examples A1, and A1.2 to A8 in which the tungsten content of the niobium alloy is in the range of 0.01 to 10 wt % are low. In particular, the index numbers of leakage current of the trial electrolytic capacitors of Examples A1, and A1.3 to A1.6 in which the tungsten content of niobium alloy is in the range of 0.1 to 5.0 wt % are much lower. Further, similar effects may be obtained when niobium alloy is formed by alloying niobium with at least one type of additive metal selected from a group consisting of vanadium, zinc, aluminum, molybdenum, and zirconium, in place of tungsten, or when titanium alloy is used in place of the niobium alloy.

EXAMPLE C1

In Example C1, as in Example A1, 1 g of niobium(Nb) powder was added to 99 g of tungsten(W) powder as additive metal and then a rotary shaking mixer was operated for 20 minutes to mix the powder. The mixed powder was pressurized at 1500° C. in a vacuum environment until having a thickness of 100 μm to make tungsten alloy foil in which niobium was diffused.

Next, as in Example A1, the tungsten alloy foil was cut in the size of 1 cm×5 cm. The tungsten alloy foil was employed as an electrode and was anodized at 30 V in aqueous solution containing 0.6% by volume of phosphoric acid at 60° C. Thus was formed the dielectric layer on a surface of the electrode of titanium alloy foil.

The same procedure as in Example A1 was used to fabricate a trial electrolytic capacitor of Example C1, except that employing the electrode of the tungsten alloy foil with a dielectric layer formed on a surface of the electrode as an anode in place of employing the electrode of niobium alloy foil as an anode in Example A1.

EXAMPLE C2

The same procedure as in Example C1 was used to fabricate a trial electrolytic capacitor of Example C2 except the kind of additive metal. 1 g of titanium(Ti) powder in place of niobium powder in Example C1 was added to 99 g of tungsten powder.

EXAMPLE C3

The same procedure as in Example C1 was used to fabricate a trial electrolytic capacitor of Example C3 except the kind of additive metal. 1 g of tantalum(Ta) powder in place of niobium powder in Example C1 was added to 99 g of tungsten powder.

EXAMPLE C4

The same procedure as in Example C1 was used to fabricate a trial electrolytic capacitor of Example C4 except the kind of additive metal. 1 g of vanadium(V) powder in place of niobium powder in Example C1 was added to 99 g of tungsten powder.

EXAMPLE C5

The same procedure as in Example C1 was used to fabricate a trial electrolytic capacitor of Example C5 except the kind of additive metal. 1 g of zinc(Zn) powder in place of niobium powder in Example C1 was added to 99 g of tungsten powder.

EXAMPLE C6

The same procedure as in Example C1 was used to fabricate a trial electrolytic capacitor of Example C6 except the kind of additive metal. 1 g of aluminum(Al) powder in place of niobium powder in Example C1 was added to 99 g of tungsten powder.

EXAMPLE C7

The same procedure as in Example C1 was used to fabricate a trial electrolytic capacitor of Example C7 except the kind of additive metal. 1 g of molybdenum(Mo) powder in place of niobium powder in Example C1 was added to 99 g of tungsten powder.

EXAMPLE C8

The same procedure as in Example C1 was used to fabricate a trial electrolytic capacitor of Example C8 except the kind of additive metal. 1 g of zirconium(Zr) powder in place of niobium powder in Example C1 was added to 99 g of tungsten powder.

EXAMPLE C9

The same procedure as in Example C1 was used to fabricate a trial electrolytic capacitor of Example C9 except the kind of additive metal. 1 g of hafnium(Hf) powder in place of niobium powder in Example C1 was added to 99 g of tungsten powder.

EXAMPLE C10

The same procedure as in Example C1 was used to fabricate a trial electrolytic capacitor of Example C10 except the kind of additive metal. 0.5 g of tantalum powder and 0.5 g of niobium powder in place of 1 g of niobium powder in Example C1 was added to the 99 g of tungsten powder.

COMPARATIVE EXAMPLE c1

In Comparative Example c1, the same procedure as in Example C1 was used to fabricate a trial electrolytic capacitor of Comparative Example c1, except that an element of tungsten foil was made, in place of adding the niobium powder as an additive metal to the tungsten powder in Example C1.

The resultant trial electrolytic capacitors of Examples C1 to C10, Comparative Example c1, Comparative Example a1 and b1 for reference were kept at 20 V and were each determined for leakage current after 2 seconds. An index number of leakage current of each of the trial electrolytic capacitors was determined on a basis of the leakage current of trial electrolytic capacitor of Example C1 defined as 100. The results are listed in Table 3 below.

TABLE 3

| | COMPOSITION OF ELECTRODE(weight ratio) | INDEX NUMBER OF LEAKAGE CURRENT |
|---|---|---|
| EXAMPLE C1 | W:Nb = 99:1 | 100 |
| EXAMPLE C2 | W:Ti = 99:1 | 110 |
| EXAMPLE C3 | W:Ta = 99:1 | 96 |
| EXAMPLE C4 | W:V = 99:1 | 98 |
| EXAMPLE C5 | W:Zn = 99:1 | 106 |
| EXAMPLE C6 | W:Al = 99:1 | 97 |
| EXAMPLE C7 | W:Mo = 99:1 | 112 |
| EXAMPLE C8 | W:Zr = 99:1 | 102 |
| EXAMPLE C9 | W:Hf = 99:1 | 97 |
| EXAMPLE C10 | W:Ta:Nb = 99:0.5:0.5 | 94 |
| COMPARATIVE EXAMPLE c1 | W = 100 | 600 |
| COMPARATIVE EXAMPLE a1 | Nb = 100 | 240 |
| COMPARATIVE EXAMPLE b1 | Ti = 100 | 450 |

As is apparent from the table, the trial electrolytic capacitors of Examples C1 to C10 decrease leakage current notably as compared with the trial electrolytic capacitor of Comparative Example c1 employing the electrode of an element of tungsten with a dielectric layer formed by anodizing the electrode, Comparative Example a 1 employing the electrode of an element of niobium, or Comparative Example b1 employing the electrode of an element of titanium, the capacitors of Examples C1 to C10 employing the electrodes of tungsten alloy formed by alloying tungsten with at least one type of additive metal selected from a group consisting of niobium, titanium, tantalum, vanadium, zinc, aluminum, molybdenum, zirconium, and hafnium, with dielectric layers formed by anodizing the electrodes.

EXAMPLE C1.1~C1.10

The same procedure as in Example C1 was taken to fabricate trial electrolytic capacitors of Example C1.1~C1.10, except that the rate of niobium(Nb) powder of additive metal added to tungsten (W) powder was changed to make tungsten alloy foils that have different niobium content (wt %) of the tungsten alloy from that of Example C1 as listed in the Table 4.

The same determination for leakage current was taken as mentioned above, and an index number of the leakage current of each of the resultant trial electrolytic capacitors of Example C1.1 to C1.10 was determined on the basis of the leakage current of the trial electrolytic capacitor of Example C1 defined as 100. The results are listed in Table 4 below.

TABLE 4

|  | Nb CONTENT OF W ALLOY (wt %) | INDEX NUMBER OF LEAKAGE CURRENT |
| --- | --- | --- |
| EXAMPLE C1.1 | 0.005 | 220 |
| EXAMPLE C1.2 | 0.01 | 115 |
| EXAMPLE C1.3 | 0.1 | 108 |
| EXAMPLE C1.4 | 0.5 | 105 |
| EXAMPLE C1 | 1.0 | 100 |
| EXAMPLE C1.5 | 2.5 | 110 |
| EXAMPLE C1.6 | 5.0 | 117 |
| EXAMPLE C1.7 | 7.5 | 130 |
| EXAMPLE C1.8 | 10.0 | 145 |
| EXAMPLE C1.9 | 11.0 | 210 |
| EXAMPLE C1.10 | 12.5 | 250 |

As is apparent from the table, the index numbers of leakage current of the trial electrolytic capacitors of Example C1, and C1.2 to C1.8 in which the niobium content of the tungsten alloy was in the range of 0.01 to 10.0 wt % are low. Particularly, the index numbers of leakage current of the trial electrolytic capacitors of Examples C1, and C1.2 to C1.6 in which the niobium content of tungsten alloy was in the range of 0.01 to 5.0 wt % are much lower. Further, similar effects may be obtained when tungsten alloy is formed by alloying tungsten with at least one type of additive metal selected from a group consisting of titanium, tantalum, vanadium, zinc, aluminum, molybdenum, zirconium, and hafnium, in place of niobium.

EXAMPLE D1

In Example D1, an electrode of an element of niobium foil which has a thickness of 100 im and a size of 1 cm×5 cm, as in Comparative Example a1, was made. Then fluorine was doped in the electrode by heat-treating the electrode in the fluorine gas atmosphere at 60° C. for 1 hour.

Next, a dielectric layer was formed on a surface of thus fluorine-doped electrode of niobium foil by anodizing the electrode at 30 V in aqueous solution containing 0.6% by volume of phosphoric acid at 60° C. In a mode, as a result of analysis by Electron Spectroscopy for Chemical Analysis (ESCA), it was confirmed that niobium fluoride was contained in the dielectric layer.

The same procedure as in Example A1 was used to fabricate a trial electrolytic capacitor of Example D1, except that employing the electrode of niobium foil, with the thus formed dielectric layer on a surface of the electrode as an anode in place of employing the electrode of niobium alloy foil as an anode in Example A1.

EXAMPLE D2

In Example D2, the electrode of an element of niobium foil which has a thickness of 100 μm and a size of 1 cm×5 cm as in Comparative Example a1 was made.

Next, a dielectric layer was formed on a surface of the electrode of niobium foil by anodizing the electrode at 30 V in aqueous solution containing 0.2% by volume of ammonium fluoride at 60° C. In a mode, as a result of analysis by Electron Spectroscopy for Chemical Analysis (ESCA), it was confirmed that niobium fluoride was contained in the dielectric layer, same as in Example D1.

The same procedure as in Example A1 was used to fabricate a trial electrolytic capacitor of Example D2, except that employing the electrode of niobium foil with thus formed dielectric layer on the surface of the electrode as an anode in place of employing the electrode of niobium alloy foil as an anode in Example A1.

EXAMPLE D3

The same procedure as in Example D2 was used to form a dielectric layer on a surface of the electrode of niobium foil, except that aqueous solution of potassium fluoride in place of aqueous solution of ammonium fluoride in Example D2 was used in anodizing the electrode. In a mode, as a result of analysis by Electron Spectroscopy for Chemical Analysis (ESCA), it was confirmed that niobium fluoride was contained in the dielectric layer as in Example D1.

The same procedure as in Example A1 was used to fabricate a trial electrolytic capacitor of Example D3, except that employing the electrode of niobium foil with thus formed dielectric layer on a surface of the electrode as an anode in place of employing the electrode of niobium alloy foil as an anode in Example A1.

EXAMPLE D4

The same procedure as in Example D2 was used to form a dielectric layer on a surface of the electrode of niobium foil, except that aqueous solution of sodium fluoride in place of aqueous solution of ammonium fluoride in Example D2 was used in anodizing the electrode. In a mode, as a result of analysis by Electron Spectroscopy for Chemical Analysis (ESCA), it was confirmed that niobium fluoride was contained in the dielectric layer as in Example D1.

The same procedure as in Example A1 was used to fabricate a trial electrolytic capacitor of Example D4, except that employing the electrode of niobium foil with the thus formed dielectric layer on a surface of the electrode as an anode in place of employing the electrode of niobium alloy foil as an anode in Example A1.

EXAMPLE D5

The same procedure as in Example D2 was used to form a dielectric layer on a surface of the electrode of niobium foil, except that the fluoric acid in place of aqueous solution of ammonium fluoride in Example D2 was used in anodizing the electrode. In a mode, as a result of analysis by Electron Spectroscopy for Chemical Analysis (ESCA), it was confirmed that niobium fluoride was contained in the dielectric layer as in Example D1.

The same procedure as in Example A1 was used to fabricate a trial electrolytic capacitor of Example D5, except that employing the electrode of niobium alloy foil with the thus formed dielectric layer on a surface of the electrode as an anode in place of employing the electrode of niobium alloy foil as an anode in Example A1.

EXAMPLE D6

In Example D6, the electrode of niobium alloy foil which contains 1 wt % of tungsten and has a thickness of 100 μm and a size of 1 cm×5 cm was made as in Example A1. Then, fluorine was doped in the electrode by heat-treating the electrode in fluorine gas atmosphere at 60 used ° C. for 1 hour.

Next, a dielectric layer was formed on a surface of thus fluorine-doped electrode of niobium alloy foil by anodizing the electrode at 30 V in aqueous solution containing 0.6% by volume of phosphoric acid at 60° C. In a mode, as a result of analysis by Electron Spectroscopy for Chemical Analysis (ESCA), it was confirmed that niobium fluoride was contained in the dielectric layer as in the Example D1.

The same procedure as in Example A1 was used to fabricate a trial electrolytic capacitor of Example D6, except that employing the electrode of niobium alloy foil with the thus formed dielectric layer on a surface of the electrode as an anode in place of employing the electrode of niobium alloy foil as an anode in Example A1.

EXAMPLE D7

In Example D7, the electrode of niobium alloy foil which contains 1 wt % of tungsten and has a thickness of 100 μm and a size of 1 cm×5 cm was made as in Example A1.

Next, a dielectric layer was formed on a surface of the electrode of the niobium alloy foil by anodizing the electrode at 30 V in aqueous solution containing 0.2% by volume of ammonium fluoride at 60° C. In a mode, as a result of analysis by Electron Spectroscopy for Chemical Analysis (ESCA), it was confirmed that niobium fluoride was contained in the dielectric layer as in Example D1.

The same procedure as in Example A1 was used to fabricate a trial electrolytic capacitor of Example D7, except that employing the electrode of niobium alloy foil with thus formed dielectric layer on a surface of the electrode as an anode in place of employing the electrode of niobium alloy foil as an anode in Example A1.

EXAMPLE D8

The same procedure as in Example D7 was used to form a dielectric layer on a surface of the electrode of niobium alloy foil, except that an aqueous solution of potassium fluoride in place of an aqueous solution of ammonium fluoride in Example D2 was used in anodizing the electrode. In a mode, as a result of analysis by Electron Spectroscopy for Chemical Analysis (ESCA), it was confirmed that niobium fluoride was contained in the dielectric layer as in Example D1.

The same procedure as in Example A1 was used to fabricate a trial electrolytic capacitor of Example D8, except that employing the electrode of niobium alloy foil with the thus formed dielectric layer on a surface of the electrode as an anode in place of employing the electrode of niobium alloy foil as an anode in Example A1.

EXAMPLE D9

The same procedure as in Example D7 was used to form a dielectric layer on a surface of the electrode of niobium alloy foil, except that an aqueous solution of sodium fluoride in place of aqueous solution of ammonium fluoride in Example D7 was used in anodizing the electrode. In a mode, as a result of analysis by Electron Spectroscopy for Chemical Analysis (ESCA), it was confirmed that niobium fluoride was contained in the dielectric layer as in Example D1.

The same procedure as in Example A1 was used to fabricate a trial electrolytic capacitor of Example D9, except that employing the electrode of niobium alloy foil with the thus formed dielectric layer on a surface of the electrode as an anode in place of employing the electrode of niobium alloy foil as an anode in Example A1.

EXAMPLE D10

The same procedure as in Example D7 was used to form a dielectric layer on a surface of the electrode of niobium alloy foil, except that fluoric acid in place of aqueous solution of ammonium fluoride in Example D7 was used in anodizing the electrode. In a mode, as a result of analysis by Electron Spectroscopy for Chemical Analysis (ESCA), it was confirmed that niobium fluoride was contained in the dielectric layer as in Example D1.

The same procedure as in Example A1 was used to fabricate a trial electrolytic capacitor of Example D10, except that employing the electrode of niobium alloy foil with the thus formed dielectric layer on a surface of the electrode as an anode in place of employing the electrode of niobium alloy foil as an anode in Example A1.

The resultant trial electrolytic capacitors of Examples D1 to D10, Comparative Example a1 and Example A1 for reference were kept at 20 V and were each determined for leakage current after 2 seconds. By the way, in Examples D1 to D10 fluorine is doped in the dielectric layer on a surface of the electrode, and in Comparative Example a1 and Example A1, the fluorine is not doped in the dielectric layer on a surface of the electrode. An index number of leakage current of each of the trial electrolytic capacitors was determined on a basis of the leakage current of Example-D2 trial electrolytic capacitor defined as 100. The results are listed in Table 5 below.

TABLE 5

| | COMPOSITION OF ELECTRODE (WEIGHT RATIO) | FLUORINE DOPED/NOT DOPED | INDEX NUMBER OF LEAKAGE CURRENT |
|---|---|---|---|
| EXAMPLE D1 | Nb = 100 | DOPED | 125 |
| EXAMPLE D2 | Nb = 100 | DOPED | 120 |
| EXAMPLE D3 | Nb = 100 | DOPED | 123 |
| EXAMPLE D4 | Nb = 100 | DOPED | 122 |
| EXAMPLE D5 | Nb = 100 | DOPED | 123 |
| COMPARATIVE EXAMPLE a1 | Nb = 100 | NOT DOPED | 270 |
| EXAMPLE D6 | Nb:W = 99:1 | DOPED | 100 |
| EXAMPLE D7 | Nb:W = 99:1 | DOPED | 98 |
| EXAMPLE D8 | Nb:W = 99:1 | DOPED | 99 |
| EXAMPLE D9 | Nb:W = 99:1 | DOPED | 99 |
| EXAMPLE D10 | Nb:W = 99:1 | DOPED | 99 |
| EXAMPLE A1 | Nb:W = 99:1 | NOT DOPED | 108 |

As is apparent from the table, the trial electrolytic capacitors of Examples D1 to D10 decreased the leakage current as compared with the equivalent trial electrolytic capacitor of Comparative Example a1 and Example A1 employing the electrode of which fluorine is not doped in the dielectric layer, the capacitors of Examples D1 to D10 employing the electrode forming the dielectric layer in which niobium fluoride is contained on a surface of the electrode by anodizing the electrode.

EXAMPLE D1.1~D1.6

The same procedure as in Example D1 was used to fabricate trial electrolytic capacitors of Example D1.1~D1.10, except that the temperature of heat-treatment of the electrode of niobium foil in fluorine gas atmosphere was changed as listed in the Table 6.

The same determination for leakage current was taken as above mentioned, and an index number of leakage current of each of the resultant trial electrolytic capacitors of Examples D1.1 to D1.6 was determined on a basis of the leakage current of Example-D1 trial electrolytic capacitor defined as 100. The results are listed in Table 6 as below.

TABLE 6

| | TEMPERATURE OF HEAT-TREATMENT(°C.) | INDEX NUMBER OF LEAKAGE CURRENT |
|---|---|---|
| EXAMPLE D1.1 | 30 | 115 |
| EXAMPLE D1.2 | 40 | 102 |
| EXAMPLE D1 | 60 | 100 |
| EXAMPLE D1.3 | 100 | 102 |
| EXAMPLE D1.4 | 150 | 105 |
| EXAMPLE D1.5 | 200 | 110 |
| EXAMPLE D1.6 | 225 | 215 |

As is apparent from the table, in doping fluorine by heat-treating the electrode in the fluorine gas atmosphere, the trial electrolytic capacitors of Examples D1, and D1.1 to D1.10 of which the temperature of heat-treatment is in the range of 30 to 200° C., lower than the boiling point of niobium fluoride, decreased the leakage current as compared with the trial electrolytic capacitor of Example D1.6 in which the temperature of heat-treatment is at 225° C., the boiling point of niobium fluoride. More particularly, the trial electrolytic capacitors of Examples D1, and D1.2 to D1.4 in which the temperature of heat-treatment is in the range of 40 to 150° C. decreased the leakage current even more.

EXAMPLE E1

In Example E1, niobium powder having an average particle diameter of 1 μm and aluminum powder having an average particle diameter of 1 μm are mixed in the niobium-to-aluminum weight ratio of 99:1. To 99 parts by weight of the mixed powder, 1 part by weight of camphor was added as a binder and mixed. Then an electric terminal of niobium metal was laid in the mixed powder and the mixed powder was compressed and formed by pressing. The formed object was burned for 5 hours under the vacuum environment of $10^{-5}$ Torr to make a mixed sinter of niobium and aluminum.

As in Example A1, a dielectric layer was formed on a surface of the electrode of the mixed sinter of niobium and aluminum by anodizing the electrode of niobium alloy foil at 30 V in aqueous solution containing 0.6% by volume of phosphoric acid at 60° C.

Figure 2:
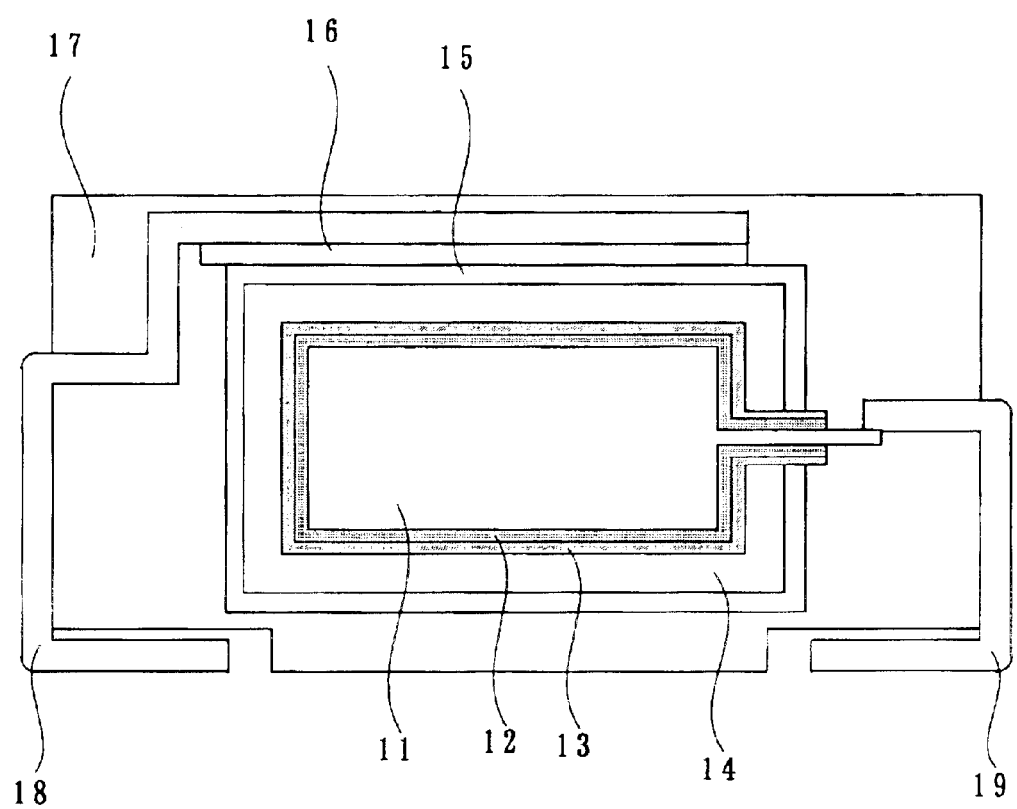
FIG. 2 is a schematic explanatory drawing of trial electrolytic capacitors which are fabricated in Example E1 to E11 and Comparative Example e1.

Next, an electrolyte layer of polypyrrole was formed on the dielectric layer by chemical polymerization and electrolytic polymerization, and then a carbon layer and a silver paste layer were formed on the electrolyte layer to fabricate the electrolytic capacitor as shown in FIG. 2.

In the electrolytic capacitor of FIG. 2, on a surface of the electrode (anode) 11 of the mixed sinter of niobium and aluminum the dielectric layer 12 was formed, and on the dielectric layer 12 the electrolyte layer 13 of polypyrrole, the carbon layer 14, the silver paste layer 15, a conductive adhesive layer 16, and a resin layer 17 were formed successively. Also an anode terminal 19 which was installed to the electrode 11 and a cathode terminal 18 which was installed to the silver paste layer 15 by the conductive adhesive layer 16 were thrust outside the resin layer 17.

EXAMPLES E2~11

The same procedure as in Example E1 was used to fabricate each of the electrolytic capacitors of Example E2~E11, except the weight ratio of mixing niobium powder having an average particle diameter of 1 μm and aluminum powder having an average particle diameter of 1 μm.

The weight ratio of mixing the niobium powder and aluminum powder is changed as follows; 99.995:0.005 in Example E2, 99.99:0.01 in Example E3, 99.9:0.1 in Example E4, 99.5:0.5 in Example E5, 97.5:2.5 in Example E6, 95:5 in Example E7, 92.5:7.5 in Example E8, 90:10 in Example E9, 89:11 in Example E10, and 87.5:12.5 in Example E11.

COMPARATIVE EXAMPLE e1

In Comparative Example e1, the same procedure as in Example E1 was used to fabricate an electrolytic capacitor of Comparative Example e1, except that an element of niobium powder having an average particle diameter of 1 μm in place of adding the aluminum powder to the niobium powder in Example E1 was used.

In a mode, as a result of analysis by Electron Spectroscopy for Chemical Analysis (ESCA), it was confirmed that niobium oxide and aluminum oxide were contained in the dielectric layer.

In the resultant electrolytic capacitors of Example E1 to E11 and Comparative Example e1, an interval of the anode terminal 19 and the cathode terminal 18 were kept at uniform voltage of 20 V and were each determined for leakage current after 2 seconds. An index number of leakage current of each of the electrolytic capacitors was determined on a basis of the leakage current of the electrolytic capacitor of Example E1 defined as 100. The results are listed in Table 7 below.

TABLE 7

| | WEIGHT RATIO IN SINTER | | INDEX NUMBER OF LEAKAGE CURRENT |
|---|---|---|---|
| | Nb | Al | |
| EXAMPLE E2 | 99.995 | 0.005 | 240 |
| EXAMPLE E3 | 99.99 | 0.01 | 120 |
| EXAMPLE E4 | 99.9 | 0.1 | 110 |
| EXAMPLE E5 | 99.5 | 0.5 | 105 |
| EXAMPLE E1 | 99 | 1 | 100 |
| EXAMPLE E6 | 97.5 | 2.5 | 99 |
| EXAMPLE E7 | 95 | 5 | 99 |
| EXAMPLE E8 | 92.5 | 7.5 | 101 |
| EXAMPLE E9 | 90 | 10 | 102 |
| EXAMPLE E10 | 89 | 11 | 200 |
| EXAMPLE E11 | 87.5 | 12.5 | 230 |
| COMPARATIVE EXAMPLE e1 | 100 | 0 | 260 |

As is apparent from the table, the electrolytic capacitors of Examples E1 to E11 decreased the leakage current as compared with the electrolytic capacitor of Comparative Example e1 employing the electrode of the sinter of niobium itself, the capacitors of Examples E1 to E11 employing the electrodes of mixed sinter of niobium and aluminum. In particular, the electrolytic capacitors of Example E1, and E3 to E9 wherein the amount of aluminum to the total amount of niobium and aluminum is in the range of 0.01 to 10 wt % decreased the leakage current notably.

Although the present invention has been fully described by way of examples, it is to be noted that various changes and modifications will be apparent to those skilled in the art.

Therefore, unless otherwise such changes and modifications depart from the scope of the invention, they should be construed as being included therein.

What is claimed is:

1. An electrolytic capacitor comprising:

an electrode employing niobium alloy, wherein a dielectric layer is formed on a surface of the electrode by anodizing the electrode, and wherein the niobium alloy employed as the electrode is formed by alloying niobium with at least one type of additive metal selected from a group consisting of tungsten, vanadium, zinc, aluminum, molybdenum, and hafnium.

2. An electrolytic capacitor comprising:

an electrode employing niobium alloy, wherein a dielectric layer is formed on a surface of the electrode by anodizing the electrode, and wherein the niobium alloy employed as the electrode contains aluminum, and the dielectric layer formed on a surface of the electrode contains niobium oxide and aluminum oxide.

3. An electrolytic capacitor comprising:

an electrode employing titanium alloy, wherein a dielectric layer is formed on a surface of the electrode by anodizing the electrode, and wherein the titanium alloy employed as the electrode is formed by alloying titanium with at least one type of additive metal selected from a group consisting of tungsten, vanadium, zinc, aluminum, molybdenum, and hafnium.

4. An electrolytic capacitor comprising:

an electrode employing tungsten alloy, wherein a dielectric layer is formed on a surface of the electrode by anodizing the electrode, and wherein the tungsten alloy employed as the electrode is formed by alloying tungsten with at least one type of additive metal selected from a group consisting of tantalum, vanadium, zinc, aluminum, molybdenum and hafnium.

5. An electrolytic capacitor comprising:

an electrode employing one type of an alloy selected from a group consisting of niobium alloy, titanium alloy, and tungsten alloy, wherein a dielectric layer is formed on a surface of the electrode by anodizing the electrode, and wherein a total content of the additive metal content of each alloy is in the range of 0.01 to 10 wt %.

6. An electrolytic capacitor comprising:

an electrode of mixed sinter of niobium and aluminum, made by sintering mixed powder of niobium and aluminum, wherein a dielectric layer containing niobium oxide and aluminum oxide is formed on a surface of the electrode by anodizing the electrode.

7. The electrolytic capacitor as claimed in claim 6, wherein the amount of aluminum to the total amount of niobium and aluminum is in the range of 0.01 to 10 wt %.

8. An electrolytic capacitor comprising:

an electrode of fluorine-doped niobium or fluorine-doped niobium alloy; and a dielectric layer formed on a surface of the electrode by anodizing the electrode.

9. The electrolytic capacitor as claimed in claim 8, wherein the dielectric layer contains niobium fluoride.

* * * * *